(12) United States Patent
Yoshioka et al.

(10) Patent No.: US 12,143,965 B2
(45) Date of Patent: Nov. 12, 2024

(54) TERMINAL

(71) Applicant: NTT DOCOMO, INC., Tokyo (JP)

(72) Inventors: Shohei Yoshioka, Tokyo (JP); Satoshi Nagata, Tokyo (JP); Yanru Wang, Beijing (CN)

(73) Assignee: NTT DOCOMO, INC., Tokyo (JP)

(*) Notice: Subject to any disclaimer, the term of this patent is extended or adjusted under 35 U.S.C. 154(b) by 352 days.

(21) Appl. No.: 17/632,712

(22) PCT Filed: Aug. 8, 2019

(86) PCT No.: PCT/JP2019/031525
§ 371 (c)(1),
(2) Date: Feb. 3, 2022

(87) PCT Pub. No.: WO2021/024493
PCT Pub. Date: Feb. 11, 2021

(65) Prior Publication Data
US 2022/0287006 A1  Sep. 8, 2022

(51) Int. Cl.
*H04W 72/12* (2023.01)
*H04W 72/02* (2009.01)
(Continued)

(52) U.S. Cl.
CPC ....... *H04W 72/02* (2013.01); *H04W 72/1263* (2013.01); *H04W 72/542* (2023.01); *H04W 92/18* (2013.01)

(58) Field of Classification Search
CPC ............... H04W 72/02; H04W 72/542; H04W 72/1263; H04W 92/18
See application file for complete search history.

(56) References Cited

U.S. PATENT DOCUMENTS 10,485,038 B2 * 11/2019 Agiwal ................. H04W 76/14
10,743,208 B2 *  8/2020 Lim ....................... H04L 1/0027
(Continued)

FOREIGN PATENT DOCUMENTS

CN         107979402 A    5/2018
WO       2018128580 A1    7/2018
(Continued)

OTHER PUBLICATIONS

Intel Corporation, 3GPP TSG RAN WG1 Meeting #97 R1-1906799, May 17, 2019, 3GPP, Agenda 7.2.4.5, p. 1-14. (Year: 2019) <https://www.3gpp.org/ftp/tsg_ran/WG1_RL1/TSGR1_97/Docs/R1-1906799.zip>.*
(Continued)

*Primary Examiner* — Sai Aung
(74) *Attorney, Agent, or Firm* — Osha Bergman Watanabe & Burton LLP (57) ABSTRACT

A terminal including a transmission unit that transmits a trigger of a channel state information report to another terminal, a reception unit that receives the channel state information report with at least one of following conditions: in a specific duration; after a specific duration; in a predetermined resource; and in a resource after an ACK or a NACK corresponding to the trigger, and a control unit that determines at least one of: a failure of the trigger; and a failure of the channel state information report, or performs an operation corresponding to the failure is provided.

4 Claims, 8 Drawing Sheets

(51) Int. Cl.
*H04W 72/1263* (2023.01)
*H04W 72/542* (2023.01)
*H04W 92/18* (2009.01)

(56) References Cited

U.S. PATENT DOCUMENTS

| | | | |
|---|---|---|---|
| 11,317,381 B2* | 4/2022 | Li | H04W 28/0278 |
| 2014/0098759 A1* | 4/2014 | Noh | H04W 72/21 |
| | | | 370/329 |
| 2016/0037463 A1* | 2/2016 | Siomina | H04W 52/365 |
| | | | 370/330 |
| 2019/0098523 A1* | 3/2019 | Muruganathan | H04L 5/005 |
| 2019/0253184 A1 | 8/2019 | Xing | |
| 2020/0022089 A1* | 1/2020 | Guo | H04L 1/1812 |
| 2020/0229002 A1* | 7/2020 | Kaikkonen | H04W 56/001 |
| 2020/0229209 A1* | 7/2020 | Sorrentino | H04W 72/569 |
| 2020/0267584 A1* | 8/2020 | Kim | H04L 1/0026 |
| 2020/0374093 A1 | 11/2020 | Song et al. | |
| 2021/0050888 A1* | 2/2021 | Manolakos | H04L 5/0023 |
| 2021/0136731 A1* | 5/2021 | Li | H04W 28/0278 |
| 2021/0307025 A1* | 9/2021 | Hosseini | H04B 7/0645 |
| 2021/0314038 A1* | 10/2021 | Matsumura | H04L 25/0202 |
| 2021/0385842 A1* | 12/2021 | Zhao | H04L 5/0091 |
| 2022/0014338 A1* | 1/2022 | Yoshioka | H04W 8/005 |
| 2022/0039100 A1* | 2/2022 | Yoshioka | H04W 72/543 |
| 2022/0095277 A1* | 3/2022 | Aiba | H04W 72/20 |
| 2022/0141799 A1* | 5/2022 | Lee | H04L 1/1822 |
| | | | 370/329 |
| 2022/0149924 A1* | 5/2022 | Zhang | H04W 72/1263 |
| 2022/0158804 A1* | 5/2022 | Lee | H04W 4/40 |
| 2022/0182866 A1* | 6/2022 | Lee | H04L 5/0048 |
| 2022/0183017 A1* | 6/2022 | Wu | H04B 17/309 |
| 2022/0217741 A1* | 7/2022 | Yoshioka | H04W 72/1263 |
| 2022/0386403 A1* | 12/2022 | Park | H04W 76/14 |

FOREIGN PATENT DOCUMENTS

| | | |
|---|---|---|
| WO | 2019/130556 A1 | 7/2019 |
| WO | 2019/137224 A1 | 7/2019 |

OTHER PUBLICATIONS

3GPP TSG RAN WG1 #97; R1-1906209 "NR Sidelink Physical Layer Procedure" NTT Docomo, Inc.; Reno, USA; May 13-17, 2019 (14 pages).

3GPP TS 36.213 V14.3.0 "3rd Generation Partnership Project; Technical Specification Group Radio Access Network; Evolved Universal Terrestrial Radio Access (E-UTRA); Physical layer procedures (Release 14)" Jun. 2017 (460 pages).

International Search Report issued in International Application No. PCT/JP2019/031525, mailed Feb. 25, 2020 (5 pages).

Written Opinion issued in International Application No. PCT/JP2019/031525; Dated Feb. 25, 2020 (4 pages).

Kyocera; "Physical Layer Procedures for CSI acquisition in unicast transmissions"; 3GPP TSG-RAN WG1#97, R1-1907103; Reno, Nevada; May 13-17, 2019 (3 pages).

Extended European Search Report issued in European Application No. 19940621.6, dated Mar. 16, 2023 (11 pages).

Office Action issued in Japanese Application No. 2021-537550 dated Mar. 28, 2023 (6 pages).

Office Action issued in counterpart Japanese Patent Application No. 2021-537550 mailed on Oct. 18, 2022 (6 pages).

Ericsson; "Details on CSIT acquisition for SL unicast"; 3GPP TSG-RAN WG1 Meeting #96, R1-1903175; Athens, Greece; Feb. 25-Mar. 1, 2019 (6 pages).

InterDigital Inc.; "On design of downlink signals and channels for NR-U"; 3GPP TSG RAN WG1 Ad-Hoc Meeting 1901, R1-1900784; Taipei, Taiwan; Jan. 21-25, 2019 (5 pages).

* cited by examiner

TERMINAL

TECHNICAL FIELD

The present invention relates to a terminal (user equipment) in a radio communication system.

BACKGROUND ART

In an LTE (Long Term Evolution) and a successor system of the LTE (for example, an LTE-A (LTE Advanced) and an NR (New Radio) (also referred to as to 5G)), sidelink technology (also referred to as D2D (Device to Device) sidelink), where communication devices such as UEs directly communicate with each other without using a base station, is being considered (non-patent document 1).

Also, discussions are held to implement V2X (Vehicle to Everything), and technical specifications of V2X are being developed. Here, the V2X is a portion of ITS (Intelligent Transport Systems) and collectively refers to V2V (Vehicle to Vehicle) representing communication implementations between cars, V2I (Vehicle to Infrastructure) representing communication implementations between a car and an RSU (Road-Side Unit) located by the roadside, V2N (Vehicle to Nomadic device) representing communication implementations between a car and a mobile terminal of a driver and V2P (Vehicle to Pedestrian) representing communication implementations between a car and a mobile terminal of a pedestrian.

PRIOR ART DOCUMENT

Non-Patent Document

[Non-Patent Document 1] 3GPP TS 36.213 V14.3.0 (2017-06)

SUMMARY OF INVENTION

Problem to be Solved by the Invention

In NR-V2X, it is discussed that a terminal 20A requests an SL-CSI (Sidelink Channel State Information) for a terminal 20B, and the terminal 20B reports the SL-CSI for the terminal 20A by means of a PSSCH (Physical Sidelink Shared Channel).

However, details of the request and report of the SL-CSI are not specified, and how to determine, by the terminal 20A, failure of the terminal 20A triggering the SL-CSI report, and failure of the SL-CSI report by the terminal 20B, is not clearly specified.

In light of the above aspect, the present invention aims to provide a technique for allowing the failure of triggering the SL-CSI report and the failure of the SL-CSI report to be determined appropriately. Note that the present invention is not limited to the sidelink in the V2X and may be applied to any terminal. Note that unless otherwise stated, "CSI report" is used as the same meaning as "SL-CSI report".

Means for Solving the Problem

According to the disclosed technique, there is provided a terminal, comprising: a transmission unit that transmits a trigger of a channel state information report to another terminal; a reception unit that receives the channel state information report with at least one of following conditions: in a specific duration; after a specific duration; in a predetermined resource; and in a resource after an ACK or a NACK corresponding to the trigger; and a control unit that determines at least one of a failure of the trigger and a failure of the channel state information report, or performs an operation corresponding to the failure.

Advantage of the Invention

According to the disclosed technique, the technique for allowing the failure of triggering the SL-CSI report and the failure of the SL-CSI report to be determined appropriately is provided.

EMBODIMENTS OF THE INVENTION

Hereinafter, embodiments (present embodiments) of the present invention will be described with reference to the drawings. The embodiments described below are merely one example, and embodiments to which the present invention is applied are not limited to the following embodiments.

(Sidelink Resource Allocation Modes)

Sidelink resource allocation modes in NR-V2X are described.

Figure 1:
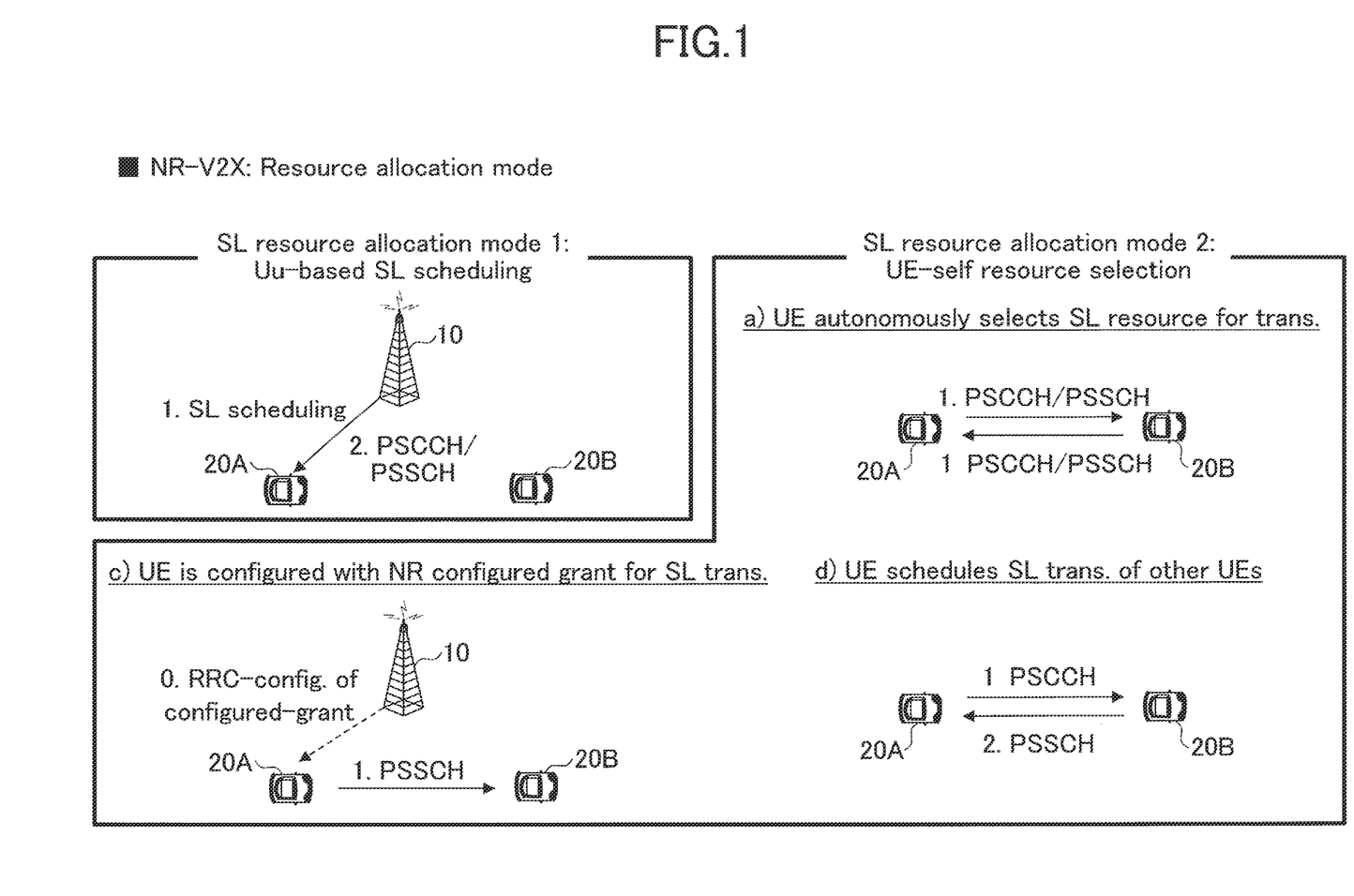
FIG. 1 is a diagram illustrating four types of sidelink resource assignment modes for NR-V2X.

FIG. 1 is a diagram illustrating sidelink resource allocation modes in the NR-V2X.

In sidelink resource allocation mode 1 in the NR-V2X, a terminal 20A transmits a PSCCH (Physical Sidelink Control Channel)/a PSSCH (Physical Sidelink Shared Channel) to a terminal 20B based on sidelink scheduling (SL scheduling) by a base station apparatus 10.

In sidelink resource allocation mode 2 in the NR-V2X, the PSCCH/PSSCH is transmitted based on resource selection by the terminal itself. The sidelink resource allocation mode 2 in the NR-V2X is further subdivided. In sidelink resource allocation mode 2-*a* in the NR-V2X, the terminal 20A transmits the PSCCH/PSSCH to the terminal 20B based on the resource selection by the terminal 20A itself, and the terminal 20B transmits the PSCCH/PSSCH to the terminal 20A based on the resource selection by the terminal 20B itself. In sidelink resource allocation mode 2-*c* in the NR-V2X, the terminal 20A transmits the PSSCH to the terminal 20B in accordance with a configuration (for example, an RRC (Radio Resource Control) Configuration)

for a resource pattern indicated from the base station apparatus 10, defined in the specification or (pre)configured.

In sidelink resource allocation mode 2-d in the NR-V2X, the terminal 20A transmits an SL scheduling to the terminal 20B to schedule transmissions of the terminal 20B, and the terminal 20B transmits the PSCCH/PSSCH to other terminals 20 (for example, the terminal 20A and the terminal 20C) based on the scheduling.

Note that any terminal may be denoted as the terminal 20 in the following description. Also, a CSI request may be replaced with an SL-CSI request.

(Request and Report of SL-CSI)

Figure 2:
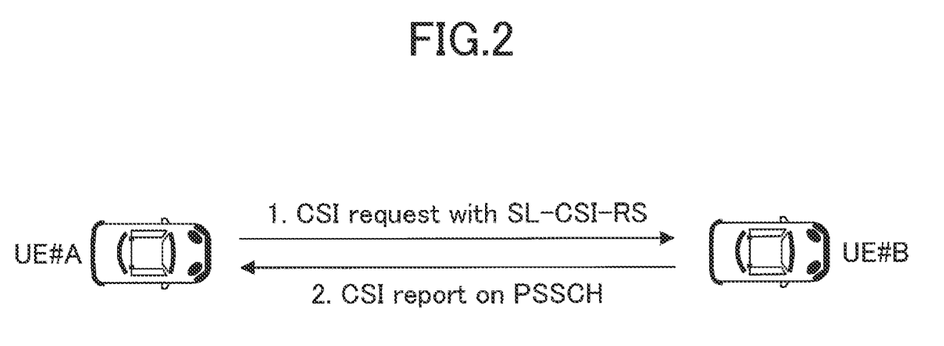
FIG. 2 is a diagram illustrating request and report of an SL-CSI.

FIG. 2 is a diagram illustrating request and report of an SL-CSI.

As illustrated in FIG. 2, the terminal 20A (UE #A) transmits a reference signal for measuring an SL-CSI (SL-CSI-RS) and a CSI request to the terminal 20B (UE #B). Specifically, if the CSI request transmitted/received in SCI (Sidelink Control Information), for example, the SL-CSI-RS is transmitted/received in/with a PSSCH corresponding to the SCI for transmitting/receiving the CSI request and/or at the same slot as the above SCI. Upon receiving the CSI request, the terminal 20B transmits the SL-CSI report to the terminal 20A by means of the PSSCH. Note that the transmission/reception of the SL-CSI-RS may be performed separately from the above CSI request.

In sidelink resource allocation mode 2 (or may be referred to as sidelink transmission mode 2), the terminal 20A may allocate (select) a sidelink resource based on the reported SL-CSI.

Also, in the case of sidelink resource allocation mode 1 (or may be referred to as sidelink transmission mode 1), the SL-CSI report may be transmitted by means of a PSSCH and/or a PUCCH (Physical Uplink Control Channel)/a PUSCH (Physical Uplink Shared Channel). Also, the SL-CSI report may be transmitted by means of a PSCCH (Physical Sidelink Control Channel)/a PSFCH (Physical Sidelink Feedback Channel). In other words, in the present disclosure, the PSSCH for the SL-CSI report may be replaced with at least one of a PUCCH, a PUSCH, a PSFCH or a PSCCH.

For transmission timings/resources of the SL-CSI report, as option 1, it is considered that the transmission timings/resources are (pre)configured and/or indicated in SCI for requesting a CSI report (referred to as "option 1" hereinafter).

For transmission timings/resources of the SL-CSI report, as option 2, it is considered that they are up to a terminal transmitting a CSI report (the terminal 20B in the example in FIG. 2) (referred to as "option 2" hereinafter). In other words, the terminal transmitting a CSI report may select a resource for the CSI report similar to data (SL-SCH) transmission timing.

Objective

However, details of the SL-CSI request and report are not stipulated, and it is not clearly defined how to determine failure of triggering the SL-CSI report at the terminal 20A and failure of the SL-CSI report at the terminal 20B and how the terminal operates for the failure.

Embodiment A

As embodiment A of the present invention, if transmission timings/resources of the SL-CSI report is "option 2", it is considered that an SL-CSI report window is defined, (pre)configured, configured in a PC5-RRC, or indicated in a MAC-CE, DCI or SCI.

Figure 3:
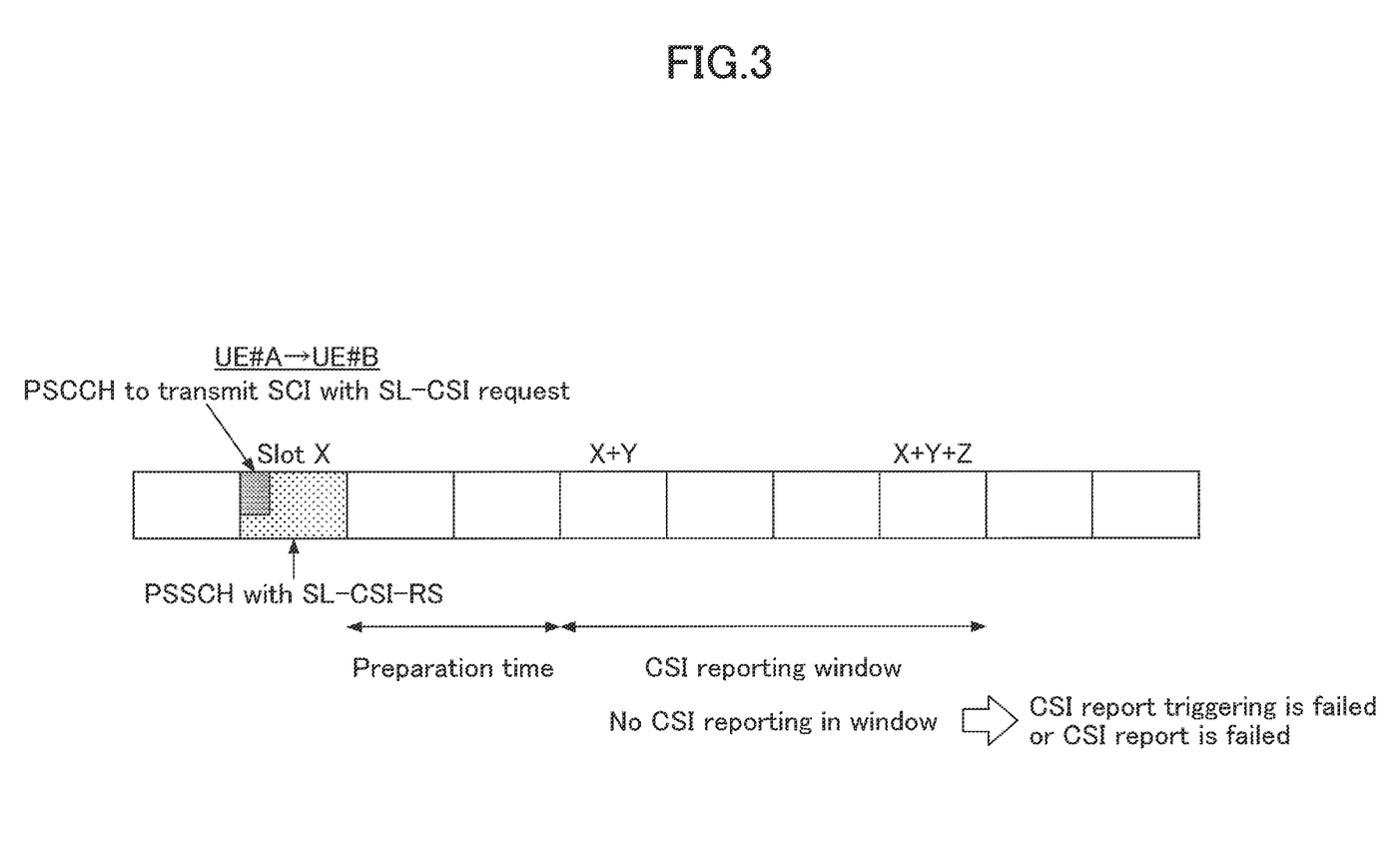
FIG. 3 is a diagram illustrating an example of an operation of a terminal according to embodiment A.

FIG. 3 is a diagram illustrating an operation of a terminal according to embodiment A. The SL-CSI report window may be configured as a duration/period from the trigger timing of the CSI report (for example, time X) to the time X+Z or a duration/period from completion of CSI calculation/preparation time (for example, the time X+Y) to the time X+Y+Z, as illustrated in FIG. 3. The time Z may be defined in the specification, (pre)configured, configured in a PC5-RRC, indicated in a MAC-CE (Media Access Control-Control Element), DCI or SCI, or depend on implementation of the terminal.

(A1) The CSI report may be transmitted and received within a CSI window. If the terminal 20 (UE #A) does not receive the CSI report from the terminal 20 (UE #B) within the above window, the terminal 20 (UE #A) can assume that the trigger of the CSI report is unsuccessful or the CSI report is unsuccessful. The terminal 20 (UE #A) can trigger the CSI report again after the above window.

If the terminal 20 (UE #A) receives a PSCCH corresponding to the CSI report within the above window and has failed to decode a PSSCH including the CSI correctly, the terminal 20 (UE #A) can assume that the CSI report is unsuccessful. Here, if an HARQ feedback is enabled, the terminal 20 (UE #A) can feed back the corresponding NACK, and the terminal 20 (UE #B) can retransmit the CSI report. Since it can be assumed that the CSI report is unsuccessful instead of triggering of the CSI report being unsuccessful, the terminal 20 (UE #A) may not (or must not) trigger the CSI report again within the above window or after the above window. If the HARQ feedback is not enabled, the corresponding NACK cannot be fed back, and the terminal 20 (UE #A) can trigger the CSI report again within the above window or after the above window.

According to the above stipulation, the terminal 20 (UE #A) can determine whether the CSI report is successful and trigger the CSI report again.

Figure 4:
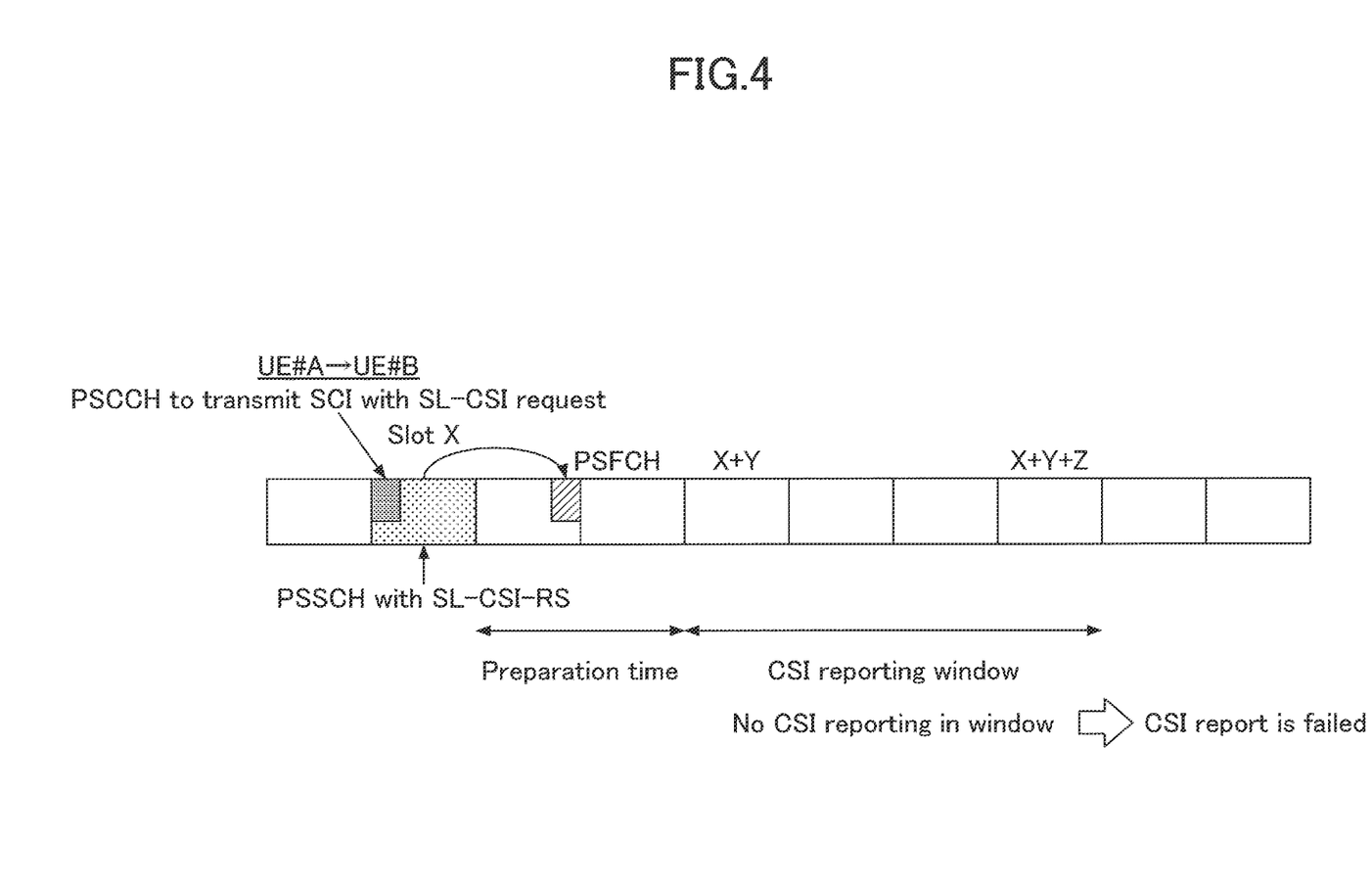
FIG. 4 is a diagram illustrating another example of an operation of a terminal according to embodiment A.

(A2) The CSI report may be transmitted and received within the CSI window, and an HARQ-ACK corresponding to a PSCCH/PSSCH from the terminal 20 (UE #A) may be transmitted and received. FIG. 4 is a diagram illustrating another example of an operation of a terminal according to embodiment A. If the terminal 20 (UE #A) does not receive the HARQ-ACK corresponding to a PSCCH/a PSSCH from the terminal 20 (UE #A) from the terminal 20 (UE #B) in a PSFCH, the terminal 20 (UE #A) can be assumed to have failed triggering of the CSI report. The terminal 20 (UE #A) can trigger the CSI report again after PSFCH timing.

If the terminal 20 (UE #A) receives an ACK or a NACK corresponding to the PSCCH/PSSCH from the terminal 20 (UE #A) from the terminal 20 (UE #B) in a PSFCH, the terminal 20 (UE #A) can be assumed that the triggering of the CSI report is successful. Note that the "ACK" or the "NACK" mat be replaced with the "ACK".

If the terminal 20 (UE #A) receives an ACK or a NACK corresponding to a PSCCH/PSSCH from the terminal 20 (UE #B) in a PSFCH and/or has failed to receive the CSI report within the window, the terminal 20 (UE #A) can assume that the CSI report is unsuccessful. The terminal 20 (UE #A) can trigger the CSI report again after the window.

According to the assumption, the terminal 20 (UE #A) can determine whether the triggering of the CSI report is unsuccessful or the CSI report is unsuccessful.

(A3) The CSI report may be necessarily transmitted and received within the window. If the terminal 20 (UE #B)

cannot transmit the CSI report within the window, the terminal 20 (UE #B) may drop the CSI report.

According to such stipulation, the terminal 20 (UE #A) and the terminal 20 (UE #B) can have the same understanding regarding whether the CSI report must be triggered again.

Note that since the CSI report out of the window may lead to a wider spacing between the trigger and the report, the accuracy of the CSI report may be lowered due to mobility of the terminal 20, and the necessity of the CSI report out of the window may be decreased.

(A4) The CSI report may be transmitted within the window or out of the window. Even if the terminal 20 (UE #B) cannot transmit the CSI report within the window, the terminal 20 (UE #B) can transmit the CSI report after the window. The terminal 20 (UE #A) may not be allowed to transmit a trigger of the CSI report to the same terminal 20 within the window.

According to the stipulation, the terminal 20 (UE #A) can receive the CSI report regardless of the window.

Note that the above-stated "window" may be replaced with a "timer" or a "counter".

As illustrated in embodiment A, the terminal 20 (UE #A) can determine the state of the CSI report appropriately and which of its own actions is appropriate.

Embodiment B

Figure 5:
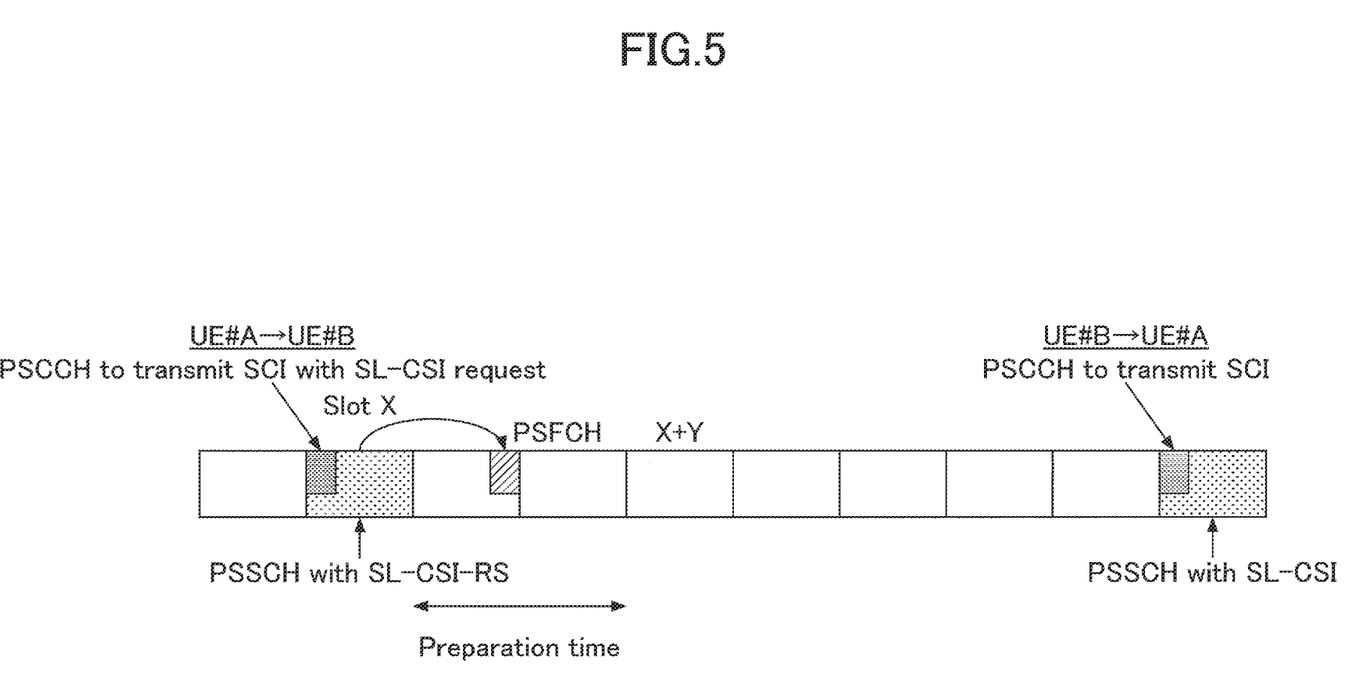
FIG. 5 is a diagram illustrating an example of an operation of a terminal according to embodiment B.

FIG. 5 is a diagram illustrating an example of an operation of the terminal according to embodiment B.

As embodiment B of the present invention, it is considered that if transmission timings/resources of an SL-CSI report are "option 2" or "option 1", an HARQ-ACK corresponding to a PSCCH/PSSCH regarding a trigger of the CSI report is necessarily transmitted and received, as illustrated in FIG. 5.

If the terminal 20 (UE #A) does not receive the HARQ-ACK corresponding to the PSCCH/PSSCH from the terminal 20 (UE #A) from the terminal 20 (UE #B) in a PSFCH, the terminal 20 (UE #A) may assume that the trigger of the CSI report is unsuccessful. The terminal 20 (UE #A) can trigger the CSI report again after the reception timing of the PSFCH.

If the terminal 20 (UE #A) receives an ACK or a NACK corresponding to a PSCCH/PSSCH from the terminal 20 (UE #A) from the terminal 20 (UE #B) in a PSFCH, the terminal 20 (UE #A) can assume that the trigger of the CSI report is successful. Note that the "ACK" or the "NACK" may be replaced with the "ACK".

If the transmission timing/resource of the SLC-SCI report is option 2 (up to terminal 20B), the terminal 20 (UE #B) can transmit the corresponding CSI report at any timing. Here, calculation time of the CSI may not be considered.

In embodiment B, the CSI report may be enabled only if an HARQ-ACK feedback function is enabled.

According to embodiment B, the terminal 20 (UE #A) can determine the state of the CSI report without any window (without using any window).

Figure 6:
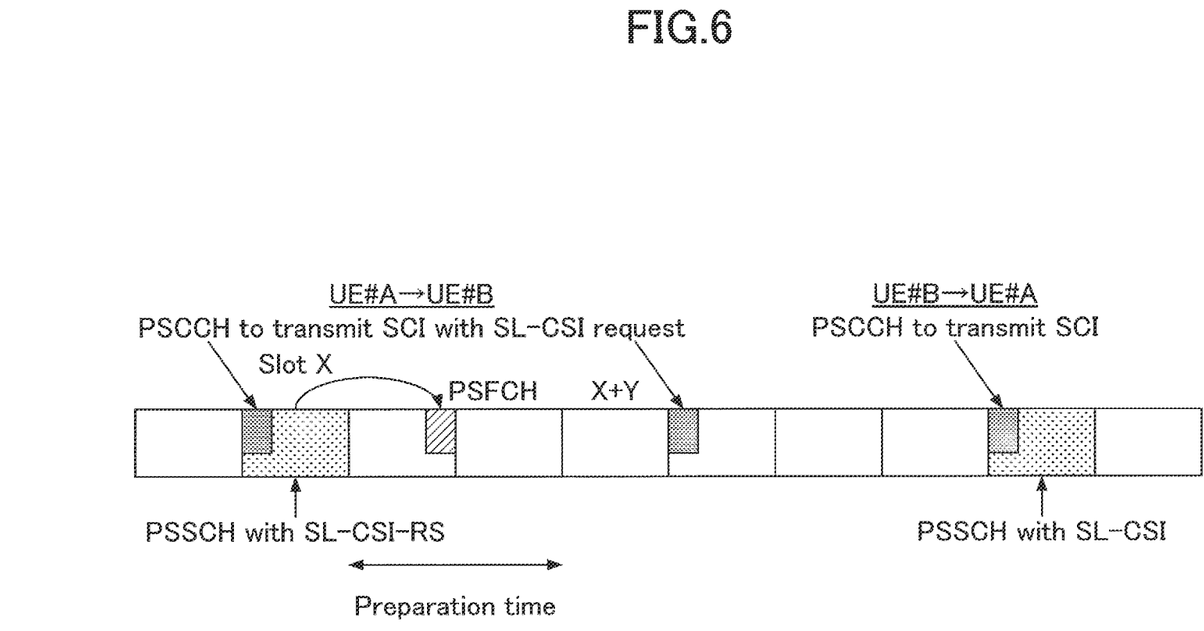
FIG. 6 is a diagram illustrating another example of an operation of a terminal according to embodiment B.

FIG. 6 is a diagram illustrating another example of an operation of the terminal according to embodiment B.

As illustrated in FIG. 6, in embodiment B, if the terminal 20 (UE #A) receives an ACK from the terminal 20 (UE #B) corresponding to the PSCCH/PSSCH associated with an SL-CSI request from the terminal 20 (UE #A) but does not receive the CSI report, the terminal 20 (UE #A) may transmit the PSCCH including the SL-CSI request periodically (repeatedly) before receiving the PSCCH/PSSCH including the SL-CSI report from the terminal 20 (UE #B).

The above cycle may be defined, (pre)configured, configured in a PC5-RRC, indicated in a MAC-CE, SCI or DCI (Downlink Control Information) or depend on implementation of the terminal 20. If the terminal 20 (UE #A) transmits a different PSCCH/PSSCH, the terminal 20 (UE #A) may stop transmitting the SL-CSI request.

Embodiment C

As embodiment C of the present invention, it is considered that if the transmission timing/resource of an SL-CSI report is "option 1", the terminal 20 (UE #B) can transmit a CSI report in the (pre)configured or indicated resource.

(C1) The terminal 20 (UE #B) may transmit the CSI report in the resource without sensing before transmission or even if it is assumed that the resource is used by other terminals 20.

The terminal 20 (UE #B) may determine whether the resource is available, for example, by sensing. (C2) As a result of the sensing, if the CSI report is unsuccessful in the resource, the terminal 20 (UE #B) may drop the CSI report.

(C3) As a result of the sensing, if the CSI report is unsuccessful in the resource, the terminal 20 (UE #B) may transmit the CSI report in any resource different from the resource based on the sensing.

According to embodiment C, the terminal 20 (UE #A) can determine the state of the CSI report appropriately and which of its own actions is appropriate.

Note that embodiments A, B and C may be used in combinations.

(Device Arrangement)

Next, exemplary functional arrangements of the base station apparatus 10 and the terminal 20 that perform operations and actions as stated above are described. The base station apparatus 10 and the terminal 20 include functions of implementing the above-stated embodiments. Note that the base station apparatus 10 and the terminal 20 each may have only a portion of the functions of the embodiments.

<Base Station Apparatus 10>

Figure 7:
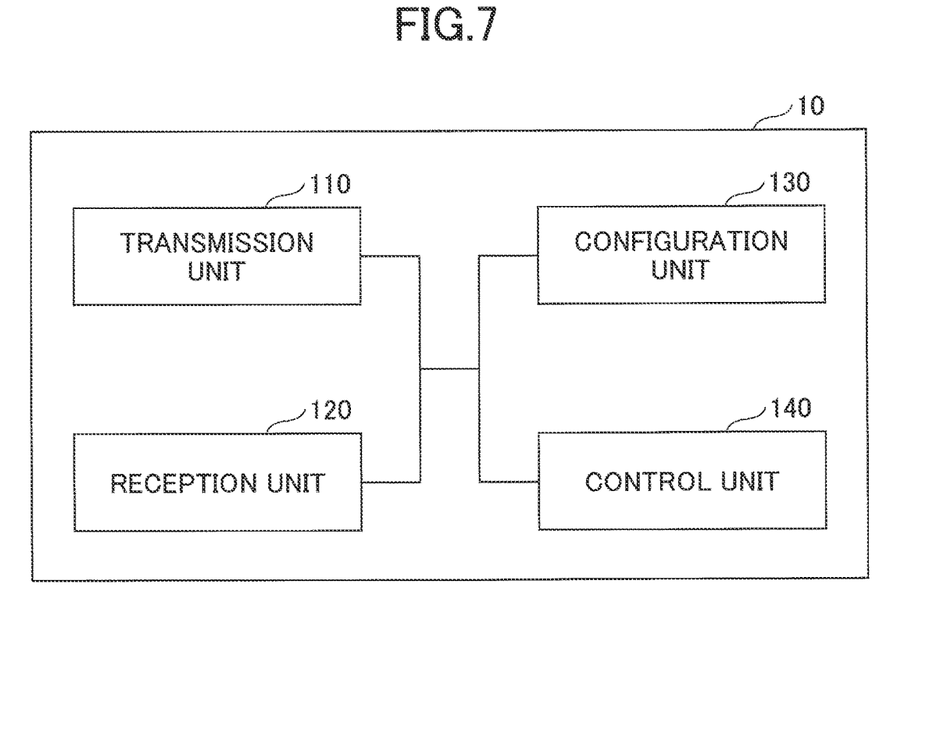
FIG. 7 is a diagram illustrating an example of functional arrangement of a base station apparatus 10 according to an embodiment.

FIG. 7 illustrates an example of functional arrangement of the base station apparatus 10. As shown in FIG. 7, the base station apparatus 10 includes a transmission unit 110, a reception unit 120, a configuration unit 130 and a control unit 140. The functional arrangement shown in FIG. 7 is only one example. The functional separation and the names of the functional units may be arbitrary as long as operations according to the embodiment of the present invention can be achieved.

The transmission unit 110 includes a function of generating a signal for transmission to the side of the terminal 20 and wirelessly transmitting the signal. Also, the transmission unit 110 transmits information regarding inter-terminal control such as an SL scheduling to the terminal 20. The reception unit 120 includes a function of receiving various signals transmitted from the terminal 20 and acquiring information for upper layers from the received signals, for example.

The configuration unit 130 stores preconfigured configurations and various configurations for transmission to the terminal 20 in a memory device and reads them from the memory device as needed. Contents of the configurations may be information associated with configurations of V2X or the like, for example.

The control unit 140 conducts operations associated with the configurations for the terminal 20 to perform the V2X as stated in conjunction with the embodiments. Also, the functional portions of the control unit 140 related to signal transmission may be included in the transmission unit 110, and the functional portions of the control unit 140 related to signal reception may be included in the reception unit 120.
<Terminal 20>

Figure 8:
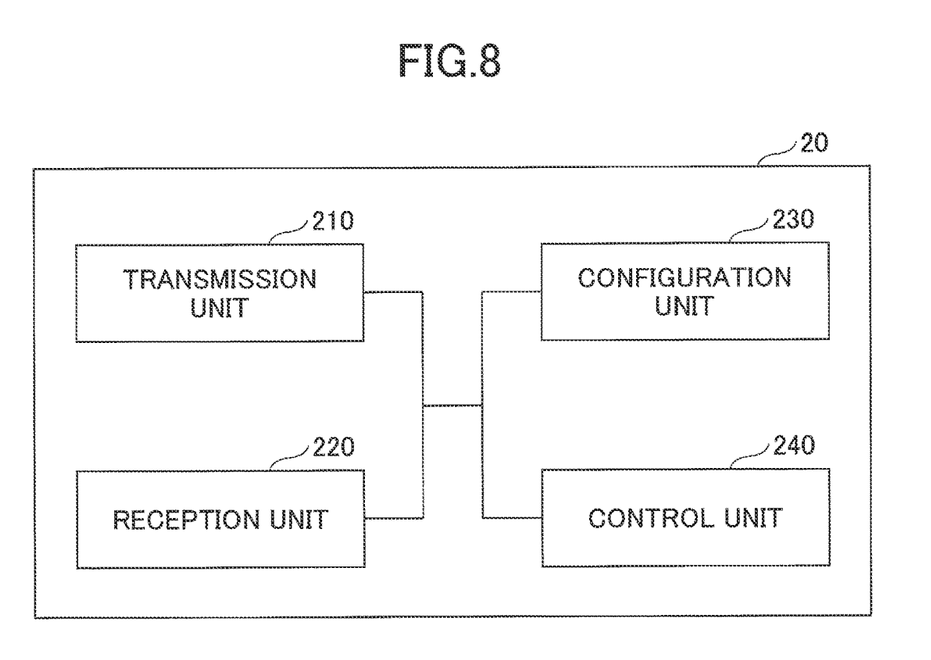
FIG. 8 is a diagram illustrating an example of functional arrangement of a terminal 20 according to an embodiment.

FIG. 8 is a diagram illustrating an example of functional arrangement of the terminal 20. As illustrated in FIG. 8, the terminal 20 has a transmission unit 210, a reception unit 220, a configuration unit 230 and a control unit 240. The functional arrangement shown in FIG. 8 is only one example. The functional separation and the names of the functional units may be arbitrary as long as operations according to the embodiments of the present invention can be achieved.

The transmission unit 210 generates a transmission signal from transmission data and wirelessly transmits the transmission signal. The reception unit 220 wirelessly receives various signals and acquires signals for upper layers from the received physical layer signals. Also, the reception unit 220 has a function of receiving control information such as an SL scheduling transmitted from the base station apparatus 10.

The configuration unit 230 stores various configurations, which are received at the reception unit 220 from the base station apparatus 10 or the terminal 20, in a memory device and reads them from the memory device as needed. Also, the configuration unit 230 stores preconfigured configurations. Contents of the configurations may be information associated with the V2X and HARQ operations and so on, for example.

The control unit 240 controls SL-CSI request and report as stated in the embodiments. The functional portion of the control unit 240 regarding signal transmission may be included in the transmission unit 210, and the functional portion of the control unit 240 regarding signal reception may be included in the reception unit 220.
(Hardware Arrangement)

The functional arrangement diagrams (FIGS. 7 and 8) used for the description of the above-stated embodiments of the present invention show blocks of functional units. These functional blocks (components) are implemented by any combination of at least one of hardware and software. In addition, the implementation method of each function block is not particularly limited. That is, each functional block may be implemented using a single device that is physically or logically combined, or may be implemented by directly or indirectly connecting two or more devices that are physically or logically separated (e.g., using wire, radio, etc.) and using these multiple devices.

Figure 9:
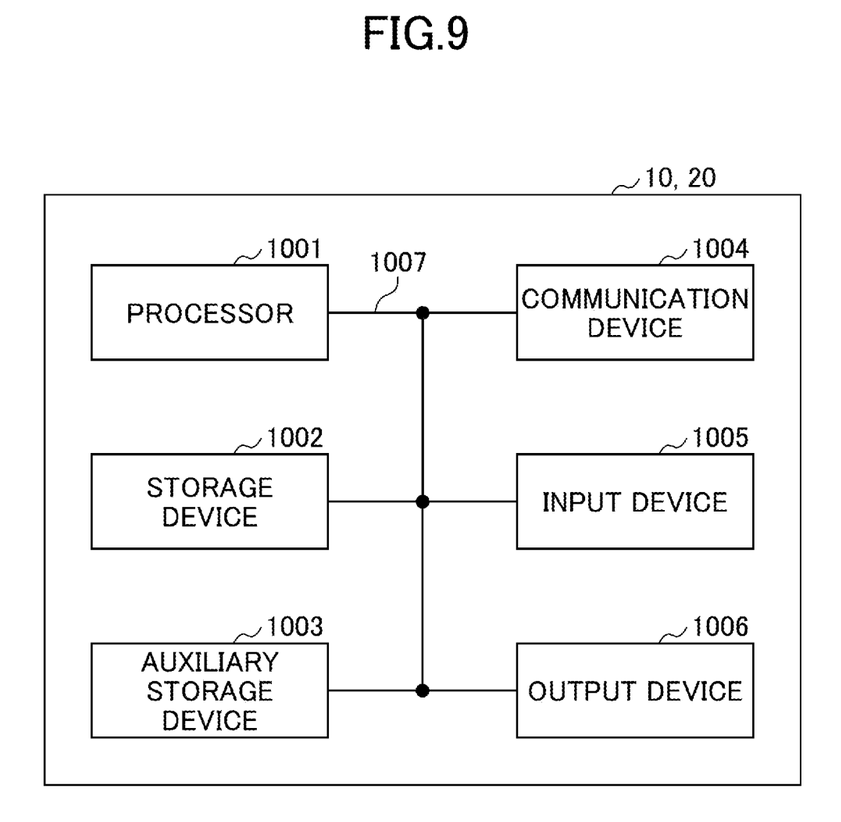
FIG. 9 is a diagram illustrating an example of hardware arrangement of the base station apparatus 10 and the terminal 20 according to an embodiment.

Also, for example, each of the base station apparatus 10 and the terminal 20 according to one embodiment of the present invention may function as a computer performing operations according to the embodiments of the present invention. FIG. 9 is a diagram illustrating an example of a hardware configuration of a radio communication device serving as the base station apparatus 10 and the terminal 20 according to one embodiment of the present invention. The base station apparatus 10 and the terminal 20 as stated above may be physically configured as a computer device including a processor 1001, a storage device 1002, a auxiliary storage device 1003, a communication device 1004, an input device 1005, an output device 1006, a bus 1007, etc.

In the following description, the term "device" can be read as a circuit, a device, a unit, etc. The hardware configuration of the base station apparatus 10 and the terminal 20 may be configured to include one or more of the respective devices 1001 to 1006 shown in the figure, or may be configured without some devices.

Each function of the base station apparatus 10 and the terminal 20 is implemented by loading predetermined software (program) on hardware, such as the processor 1001 and the storage device 1002, so that the processor 1001 performs computation and controls communication by the communication device 1004 and reading and/or writing of data in the storage device 1002 and the auxiliary storage device 1003.

The processor 1001, for example, operates an operating system to control the entire computer. The processor 1001 may be configured with a central processing unit (CPU: Central Processing Unit) including an interface with a peripheral device, a control device, a processing device, a register, etc.

Additionally, the processor 1001 reads a program (program code), a software module, data, etc., from the auxiliary storage device 1003 and/or the communication device 1004 to the storage device 1002, and executes various processes according to these. As the program, a program is used which causes a computer to execute at least a part of the operations described in the above-described embodiment. For example, the transmission unit 110, the reception unit 120, the configuration unit 130 and the control unit 140 of the base station apparatus 10 shown in FIG. 7 may be implemented by a control program that is stored in the storage device 1002 and that is operated by the processor 1001. Also, for example, the transmission unit 210, the reception unit 220, the configuration unit 230 and the control unit 240 of the terminal 20 shown in FIG. 8 may be implemented by a control program that is stored in the storage device 1002 and that is operated by the processor 1001. While the various processes described above are described as being executed in one processor 1001, they may be executed simultaneously or sequentially by two or more processors 1001. The processor 1001 may be implemented by one or more chips. The program may be transmitted from a network via a telecommunications line.

The storage device 1002 is a computer readable storage medium, and, for example, the storage device 1002 may be formed of at least one of a ROM (Read Only Memory), an EPROM (Erasable Programmable ROM), an EEPROM (Electrically Erasable Programmable ROM), a RAM (Random Access Memory), etc. The storage device 1002 may be referred to as a register, a cache, a main memory (main storage device), etc. The storage device 1002 may store a program (program code), a software module, etc., which can be executed for implementing operations according to one embodiment of the present invention.

The auxiliary storage device 1003 is a computer readable storage medium and may be formed of, for example, at least one of an optical disk, such as a CD-ROM (Compact Disc ROM), a hard disk drive, a flexible disk, an optical magnetic disk (e.g., a compact disk, a digital versatile disk, a Blu-ray (registered trademark) disk, a smart card, a flash memory (e.g., a card, a stick, a key drive), a floppy (registered trademark) disk, a magnetic strip, etc. The auxiliary storage device 1003 may be referred to as an auxiliary storage device. The above-described storage medium may be, for example, a database including at least one of the storage device 1002 and the auxiliary storage device 1003, a server, or any other suitable medium.

The communication device 1004 is hardware (transmitting and receiving device) for performing communication between computers through a wired network and/or a wireless network, and is also referred to, for example, as a network device, a network controller, a network card, a communication module, etc. For example, the transmission unit 110 and the reception unit 120 of the base station apparatus 10 may be implemented with the communication device 1004. Also, the transmission unit 210 and the reception unit 220 of the terminal 20 may be implemented with the communication device 1004.

The input device 1005 is an input device (e.g., a keyboard, a mouse, a microphone, a switch, a button, a sensor, etc.) that receives an external input. The output device 1006 is an output device (e.g., a display, speaker, LED lamp, etc.) that performs output toward outside. The input device 1005 and the output device 1006 may be configured to be integrated (e.g., a touch panel).

Each device, such as processor 1001 and storage device 1002, is also connected by the bus 1007 for communicating information. The bus 1007 may be formed of a single bus or may be formed of different buses between devices.

Also, the base station apparatus 10 and the terminal 20 each may include hardware, such as a microprocessor, a digital signal processor (DSP: Digital Signal Processor), an ASIC (Application Specific Integrated Circuit), a PLD (Programmable Logic Device), and a FPGA (Field Programmable Gate Array), which may implement some or all of each functional block. For example, the processor 1001 may be implemented using at least one of these hardware components.

Supplemental Embodiments

The embodiment of the present invention has been described above, but the disclosed invention is not limited to the above embodiment, and those skilled in the art would understand that various modified examples, revised examples, alternative examples, substitution examples, and the like can be made. In order to facilitate understanding of the present invention, specific numerical value examples are used for explanation, but the numerical values are merely examples, and any suitable values may be used unless otherwise stated. Classifications of items in the above description are not essential to the present invention, contents described in two or more items may be used in combination if necessary, and contents described in an item may be applied to contents described in another item (unless a contradiction arises). The boundaries between the functional units or the processing units in the functional block diagrams do not necessarily correspond to the boundaries of physical components. Operations of a plurality of functional units may be physically implemented by a single component and an operation of a single functional unit may be physically implemented by a plurality of components. Concerning the processing procedures described above in the embodiment, the orders of steps may be changed unless a contradiction arises. For the sake of convenience for describing the processing, the base station apparatus 10 and the terminal 20 have been described with the use of the functional block diagrams, but these apparatuses may be implemented by hardware, software, or a combination thereof. Each of software functioning with a processor of the base station 10 according to the embodiment of the present invention and software functioning with a processor of the terminal 20 according to the embodiment of the present invention may be stored in a random access memory (RAM), a flash memory, a read-only memory (ROM), an EPROM, an EEPROM, a register, a hard disk (HDD), a removable disk, a CD-ROM, a database, a server, or any suitable recording media.

Also, the notification of information is not limited to the aspect or embodiment described in the present disclosure, but may be performed by other methods. For example, the notification of information may be performed by physical layer signaling (for example, DCI (Downlink Control Information), UCI (Uplink Control Information)), higher layer signaling (for example, RRC (Radio Resource Control) signaling, MAC (Medium Access Control) signaling, broadcast information (a MIB (Master Information Block) and a SIB (System Information Block)), other signals, or combinations thereof. The RRC signaling may be also be referred to as an RRC message and may be, for example, an RRC connection setup message, an RRC connection reconfiguration message, or the like.

Each aspect and embodiment described in the present disclosure may be applied to at least one of a system that uses a suitable system such as LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (New Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), or Bluetooth (registered trademark), and a next-generation system expanded on the basis thereof.

In the operation procedures, sequences, flowcharts, and the like according to each aspect and embodiment described in the present disclosure, the orders of steps may be changed unless a contradiction arises. For example, in the methods described in the present disclosure, elements of various steps are illustrated by using an exemplary order and the methods are not limited to the specific orders presented.

The specific operations performed by the base station apparatus 10 described in the present disclosure may in some cases be performed by an upper node. It is clear that, in a network that includes one or more network nodes including the base station apparatus 10, various operations performed for communication with the terminal 20 can be performed by the base station apparatus 10 and/or another network node other than the base station apparatus 10 (for example, a MME, a S-GW, or the like may be mentioned, but not limited thereto). In the above, the description has been made for the case where another network node other than the base station apparatus 10 is a single node as an example. However, the other network node may be a combination of a plurality of other network nodes (for example, an MME and a S-GW).

Each aspect/embodiment described in the present disclosure may be used singularly or in combination and switched in execution.

By the person skilled in the art, the terminal 20 may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or other suitable terms.

By the person skilled in the art, the base station apparatus 10 may be referred to as a NB (NodeB), an eNB (evolved NodeB), a gNB, a base station or other suitable terms.

The term "determine" used herein may mean various operations. For example, judging, calculating, computing, processing, deriving, investigating, looking up, searching, inquiring (for example, looking up a table, a database, or another data structure), ascertaining, or the like may be deemed as making determination. Also, receiving (for example, receiving information), transmitting (for example, transmitting information), inputting, outputting, or accessing (for example, accessing data in a memory), or the like may be deemed as making determination. Also, resolving, selecting, choosing, establishing, comparing, or the like may be deemed as making determination. That is, doing a certain operation may be deemed as making determination. "To determine" may be read as "to assume", "to expect", "to consider", or the like.

A term "based on" used in the present disclosure does not mean "based on only" unless otherwise specifically noted. In other words, a term "base on" means both "based on only" and "based on at least".

In a case where any one of "include", "including", and variations thereof is used in the present disclosure, each of these terms is intended to be inclusive in the same way as the term "comprising". Further, the term "or" used in the present disclosure is intended to be not exclusive-or.

Throughout the present disclosure, in a case where an article such as "a", "an", or "the" in English is added through a translation, the present disclosure may include a case where a noun following the article is of a plural form.

Although the present disclosure has been described above, it will be understood by those skilled in the art that the present disclosure is not limited to the embodiment described in the present disclosure. Modifications and changes of the present disclosure may be possible without departing from the subject matter and the scope of the present disclosure defined by claims. Therefore, the descriptions of the present disclosure are for illustrative purposes only, and are not intended to be limiting the present disclosure in any way.

LIST OF REFERENCE SYMBOLS

10 Base station apparatus
110 Transmission unit
120 Reception unit
130 Configuration unit
140 Control unit
20 Terminal
210 Transmission unit
220 Reception unit
230 Configuration unit
240 Control unit
1001 Processor
1002 Memory
1003 Storage
1004 Communication device
1005 Input device
1006 Output device

The invention claimed is:

1. A terminal comprising:
a control unit that configures a channel state information report timer as time from reception of a trigger of reporting channel state information to the reporting of the channel state information, based on configuration information in communication between terminals;
a reception unit that receives the trigger from another terminal; and
a transmission unit that selects a resource for transmitting the report after the reception of the trigger, and cancels the report in a case where the report cannot be transmitted within the time.

2. The terminal as claimed in claim 1, wherein the configuration information is configured by upper layer signaling of the communication between terminals.

3. A communication system comprising: a first terminal; and a second terminal, wherein
the first terminal includes:
a reception unit that receives a trigger of reporting channel state information from the second terminal;
a control unit that configures a channel state information report timer as time from reception of a trigger of reporting channel state information to the reporting of the channel state information, based on configuration information in communication between terminals; and
a transmission unit that selects a resource for transmitting the report after the reception of the trigger, and cancels the report in a case where the report cannot be transmitted within the time, and
the second terminal includes:
a transmission unit that is capable of transmitting the trigger again to the first terminal in a case where the report is not received within the time.

4. A communication method of a terminal, the communication method comprising:
configuring a channel state information report timer as time from reception of a trigger of reporting channel state information to the reporting of the channel state information, based on configuration information in communication between terminals;
receiving the trigger from another terminal;
selecting a resource for transmitting the report after the reception of the trigger; and
canceling the report in a case where the report cannot be transmitted within the time.

* * * * *